United States Patent [19]

Ueda et al.

[11] 4,238,844
[45] Dec. 9, 1980

[54] DISPLACED POSITION DETECTING DEVICE

[75] Inventors: Toshitsugu Ueda; Seiki Ra; Masanori Noguchi, all of Musashino, Japan

[73] Assignee: Yokogawa Electric Works, Ltd., Tokyo, Japan

[21] Appl. No.: 14,429

[22] Filed: Feb. 23, 1979

[30] Foreign Application Priority Data

Feb. 28, 1978 [JP] Japan .................................. 53-22282
Feb. 28, 1978 [JP] Japan .................................. 53-22289

[51] Int. Cl.³ ........................................... G01S 15/08
[52] U.S. Cl. ...................................... 367/117; 367/96; 367/127; 367/902; 367/908
[58] Field of Search .................. 367/96, 117, 125, 127, 367/902, 908

[56] References Cited

U.S. PATENT DOCUMENTS 4,035,762  7/1977  Chamuel .......................... 367/125 X
4,144,574  3/1979  Chamuel .......................... 367/125 X Primary Examiner—Richard A. Farley
Attorney, Agent, or Firm—Parmelee, Johnson, Bollinger & Bramblett

[57] ABSTRACT

A device which detects a displaced position by generating an ultrasonic signal in a magnetostrictive wire and measuring the propagation time of the signal generated. The device includes an exciting means to generate an ultrasonic signal in a magnetostrictive wire, first and second receiving means to receive the ultrasonic signal generated in the magnetostrictive wire by the exciting means, a means for changing the distance between the exciting means and each of the first and second receiving means in accordance with a mechanical displacement, and a circuit means for producing a signal representative to the time periods required for the generated ultrasonic signal to reach the first and second receiving means.

25 Claims, 22 Drawing Figures

DISPLACED POSITION DETECTING DEVICE

BACKGROUND OF THE INVENTION

1. Field of the Invention

The present invention relates to a displaced position detecting device for converting a mechanical displacement into an electric signal. More particularly, this invention relates to an improved device capable of detecting a mechanical displaced position by utilizing the propagation time of a signal advancing in a magnetostrictive wire.

Devices according to the present invention are effective in application to positional feedback means in an automatic balance instrument, a level meter, a differential pressure transmitter and so forth.

2. Description of the Prior Art

The conventional displaced position detecting devices available heretofore for a position feedback means in an automatic balance instrument include a potentiometer, an induction potentiometer capable of converting into an electric signal a magnetic imbalance based on an angle of rotation, a flux bridge, a magnetic displacement modulator and so forth. Of these devices, the one employing a wire-wound potentiometer has disadvantages that the resolution is limited by the number of turns of the coil and also that a thermo-electromotive force is generated due to frictional heat between a slide brush and a wire resistor to cause harmful influence in the form of noise. Moreover, the service life is affected by friction. In the induction potentiometer, flux bridge and magnetic displacement modulator, there exist disadvantages of high cost and complicated structure although an advantage is found in the point that no mechanical contact component is employed.

SUMMARY OF THE INVENTION

It is an object of the present invention to provide an improved displaced position detecting device having a simple structure manufacturable at low cost. Another object of the invention resides in providing a device of the said type which is not affected by ambient conditions such as temperature and ensures a high detection accuracy.

A preferred embodiment of this invention comprises an exciting means to generate an ultrasonic striction signal in a magnetostrictive wire, first and second receiving means coupled to the magnetostrictive wire to receive the ultrasonic signal generated in the wire, a means for changing the distance between the exciting means and each of the first and second receiving means in accordance with a mechanical displacement, and a circuitry means for producing a signal representative of the mechanical displacement out of the two signals related to the time periods required for the generated ultrasonic signal to reach the first and second receiving means.

DETAILED DESCRIPTION OF THE PREFERRED EMBODIMENTS

Figure 1:
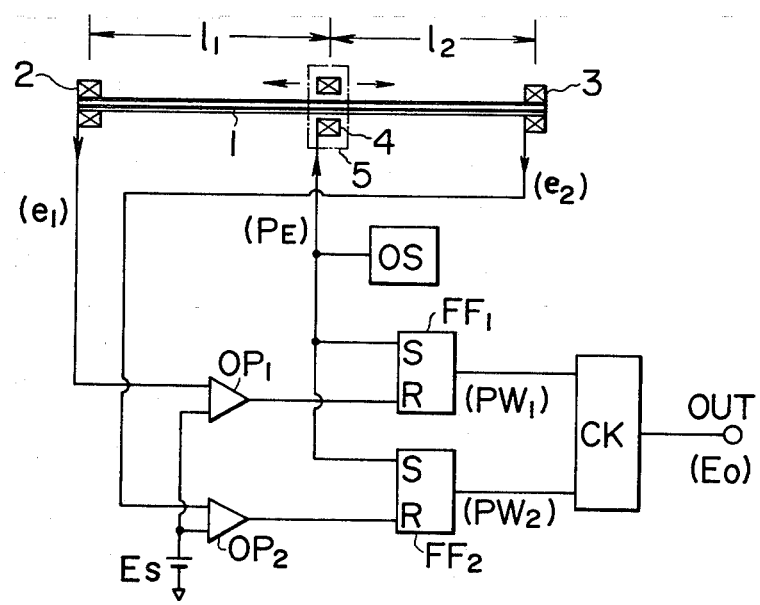
FIG. 1 is a block diagram of an embodiment of the present invention.
Figure 2:
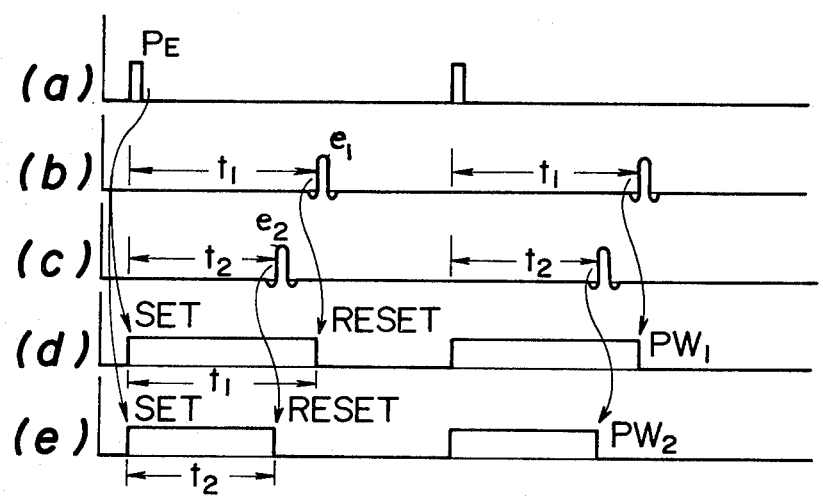
FIG. 2 illustrates signal waveforms related to the operation of the device shown in FIG. 1.

Referring now to FIGS. 1 and 2, an exciting pulse PE is developed by a pulse oscillator OS and applied to an exciting means 4 to produce an ultrasonic striction signal in a magnetostrictive wire 1 due to the so-called Joule effect. This signal propagates towards the two ends of the wire where it is detected by first and second receiving means 2, 3. Each receiving means consists of a coil in this embodiment and, when the ultrasonic signal passes in the magnetostrictive wire 1, pulsed voltage signals $e_1$ and $e_2$ are generated in the receiving means 2 and 3 due to the Villari effect, as shown in FIG. 2(b) and (c).

The time periods $t_1$ and $t_2$ required for the ultrasonic signal to reach the receiving means 2 and 3 from the exciting means 4 after propagation in the wire 1 can be represented by the following equations.

$$t_1 = (l_1/v_s) \qquad \text{(Eq. 1)}$$

$$t_2 = (l_2/v_s) \qquad \text{(Eq. 2)}$$

In which
$v_s$: velocity of ultrasonic signal propagating in magnetostrictive wire 1
$l_1$: distance between exciting means 4 (moving assembly 5) and first receiving means 2
$l_2$: distance between exciting means 4 and second receiving means 3

The exciting pulses PE are applied also to the set terminals S of flip-flop circuits $FF_1$ and $FF_2$ simultaneously with application to the exciting means 4, thereby setting $FF_1$ and $FF_2$ as shown in FIG. 2(d) and (e). After the lapse of $t_1$ and $t_2$ from application of the exciting pulse PE, the pulsed voltage signals $e_1$ and $e_2$ obtained from the first and second receiving means are applied to the reset terminals R of the flip-flop circuits $FF_1$ and $FF_2$ through the operational comparison amplifiers $OP_1$ and $OP_2$ (biased by a voltage $E_s$), thereby resetting $FF_1$ and $FF_2$ as shown in FIG. 2(d) and (e). Accordingly, time-width (duration) signals $PW_1$ and $PW_2$ having the time widths $t_1$ and $t_2$ proportional to the distances $l_1$ and $l_2$ are obtained from the output terminals of the flip-flop circuits $FF_1$ and $FF_2$ as shown in FIG. 2(d) and (e).

Computing circuitry CK receives the duration signals $PW_1$ and $PW_2$ from the flip-flop circuits $FF_1$ and $FF_2$ and executes computation of Equation (3) by detecting, for example, the time widths $t_1$ and $t_2$, thereby producing from its output terminal OUT a signal Eo which represents the displaced position x of the exciting means 4 or the moving assembly 5.

$$Eo = \frac{t_1 - t_2}{t_1 + t_2} = \frac{\frac{l_1}{v_s} - \frac{l_2}{v_s}}{\frac{l_1}{v_s} + \frac{l_2}{v_s}} = \frac{l_1 - l_2}{l_1 + l_2} \qquad \text{Eq. 3}$$
$$= \frac{x}{l_1 + l_2}$$

In which $x = l_1 - l_2$.

In Equation (3), $l_1 + l_2$ is the distance between the first receiving means 2 and the second receiving means 3. As its value remains constant regardless of the displaced position x of the moving assembly 5, the output signal Eo becomes accurately proportional to the position x. It is possible to produce the output Eo in the form of either digital or analog signal as desired by constituting the computing circuitry CK of a digital or analog configuration. The signal Eo representing the position x of the moving assembly 5 is advantageous in the point that it is not affected by the propagation velocity $v_s$ of the ultrasonic signal in the magnetostrictive wire 1 and is obtainable without passage via any mechanical contact component.

The computing circuitry CK may also be so arranged as to execute computation of Equation (4) set forth below. In such a case, however, since the output signal Eo is affected by the propagation velocity $v_s$ of the ultrasonic signal, it is desirable that the magnetostrictive wire 1 be composed of such a material as Ni-SPANC in which a variation of the propagation velocity resulting from temperature and so forth is small.

$$Eo = t_1 - t_2 = (1/v_s)(l_1 - l_2) \qquad \text{(Eq. 4)}$$

One of the features of the above-described structure resides in that the exciting means 4 for generating an ultrasonic signal in the magnetostrictive wire 1 is disposed between the two receiving means 2 and 3. By virtue of such disposition, the ultrasonic signal is permitted to propagate leftward and rightward under the same conditions from the exciting means 2, so that it is rendered possible by computing $t_1 - t_2$ to attain easy elimination of an error which occurs due to some reasons such as the time lag between application of the exciting pulse PE to the exciting means 4 and actual generation of the ultrasonic signal in the magnetostrictive wire 1. That is, Equation (4) becomes $Eo = (t_1 + \alpha) - (t_2 + \alpha) = t_1 - t_2$, and thus the influence of the time lag $\alpha$ is eliminated. In the device of FIG. 1, since both the first and second receiving means can be secured to the magnetostrictive wire 1, harmful influence of external noise and so forth is removable by housing these means in a shield case or the like.

Figure 3:
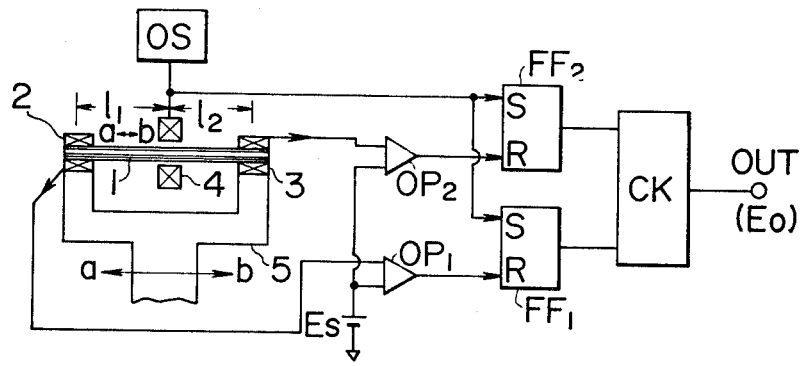
FIGS. 3 through 5 show the structures of other embodiments of the invention.
Figure 4:
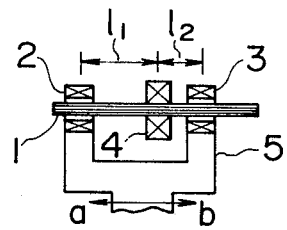
Figure 5:
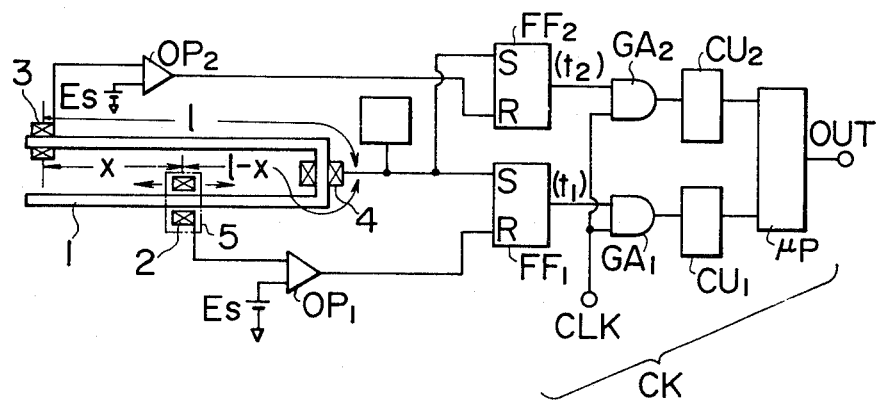

FIGS. 3 through 5 show the structures of other embodiments of the invention.

In the device of FIG. 3, a magnetostrictive wire 1 is coupled to a moving assembly 5, and an exciting means 4 is interposed between a first receiving means 2 and a second receiving means 3 through the magnetostrictive wire 1 in the manner that the wire 1 and the exciting means 4 are relatively shiftable. The two receiving means 2 and 3 are secured in the vicinity of the two ends of the magnetostrictive wire 1. In this device, therefore, the wire 1 and the two receiving means 2 and 3 are shifted in the direction of arrows a and b in response to the mechanical displacement of the moving assembly 5, so that both the distance $l_1$ between the exciting means 4 and the first receiving means 2 and the distance $l_2$ between the exciting means 4 and the second receiving means 3 are changed in relation to the mechanical displacement. The electric circuit means is the same as the one employed in the device of FIG. 1. Such a structure is effective when the mechanical displacement is extremely small to correspond to, for example, a pressure or a differential pressure.

In the embodiment of FIG. 4, an exciting means 4 is anchored substantially at the center of a magnetostrictive wire 1, and both a first receiving means 2 and a second receiving means 3 are coupled to a moving assembly 5 in the manner to be shiftable along the magnetostrictive wire 1 in response to a mechanical displacement.

In the embodiment of FIG. 5, an exciting means 4 is anchored substantially at the center of a magnetostrictive wire 1, and a first receiving means 2 is disposed to be shiftable along the wire 1 in response to a mechanical displacement, while a second receiving means 3 is secured to the other end of the wire 1. Accordingly, the distance between the exciting means 4 and the first receiving means 2 is changed in response to the mechanical displacement, while the distance between the exciting means 4 and the second receiving means is maintained constant. Therefore, with the distances l and x determined as illustrated, the time width or duration $t_1$ of a signal obtained from a flip-flop circuit $FF_1$ is represented by Equation (5), and the time width or duration $t_2$ of a signal obtained from a flip-flop circuit $FF_2$ is represented by Equation (6).

$$t_1 = (l - x)/v_s \qquad \text{(Eq. 5)}$$

$$t_2 = l/v_s \qquad \text{(Eq. 6)}$$

The computing circuitry CK receives these signals and executes the following computation to produce a signal E0 which represents the mechanical displaced position x.

$$Eo = \frac{t_2 - t_1}{t_2} = \frac{\frac{l}{v_s} - \frac{(l-x)}{v_s}}{\frac{l}{v_s}} = \frac{x}{l} \qquad \text{Eq. 7}$$

In this embodiment, the computing circuitry CK comprises gate circuits $GA_1$ and $GA_2$ controlled to be opened or closed by the signals from the flip-flop circuits $FF_1$ and $FF_2$, counters $CU_1$ and $CU_2$ for counting clock pulses CLK applied thereto through the gate circuits $GA_1$ and $GA_2$, and a microprocessor $\mu P$ for processing the digital signals obtained from the counters $CU_1$ and $CU_2$. The microprocessor $\mu P$ may be so arranged as to execute computation for a linearizer or other correcting computation in addition to Equation 7. The result is obtainable in the form of digital signal from the microprocessor $\mu P$ or in the form of analog signal through a DE converter (not shown).

Figure 6:
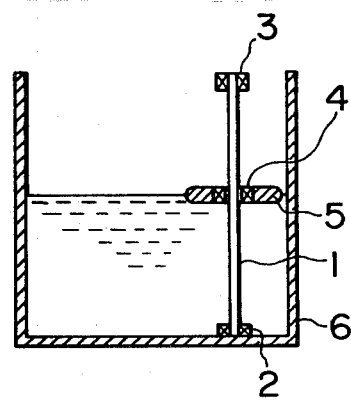
FIGS. 6 and 7 show exemplary structures where the present invention is employed.
Figure 7:
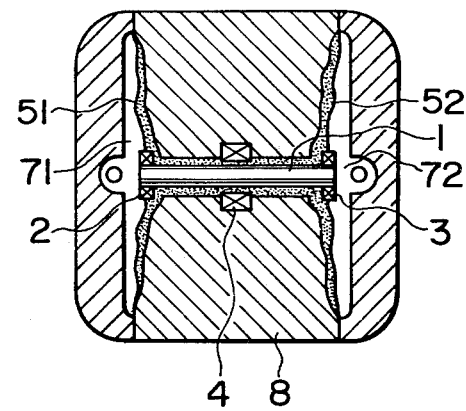

FIGS. 6 and 7 show exemplary structures where the present invention is employed. FIG. 6 is an example of application to a level meter, in which an exciting means 4 is coupled to a float 5 corresponding to the said moving assembly and is shifted vertically along a magnetostrictive wire 1 in response to a liquid level displacement in a tank 6. FIG. 7 is an example of application to a differential pressure converter, in which a connecting rod between two diaphragms 51 and 52 is composed of a magnetostrictive wire 1, and a first receiving means 2 and a second receiving means 3 are anchored at the two ends of the wire 1, and an exciting means 4 is secured to a body 8 in the manner to be interposed between the two receiving means 2 and 3. The diaphragms 51 and 52 are displaced in accordance with the difference between the pressures introduced to chambers 71 and 72 formed on the two sides of the diaphragms, thereby causing displacements of the magnetostrictive wire 1 and the two receiving means 2 and 3.

Figure 8:
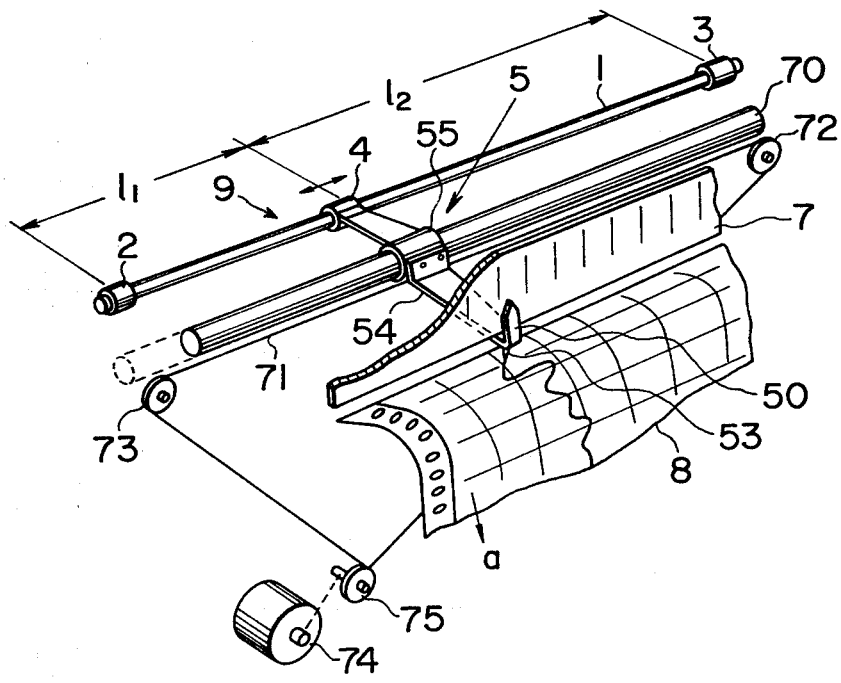
FIG. 8 shows the structure of an example where the device of this invention is applied to a positional feedback means in an automatic balance instrument.

FIG. 8 shows the structure of an example where the device of this invention is applied to a positional feedback means in an automatic balance instrument, and an application to a recorder is illustrated here. A scale plate 7 is located on the front of the instrument, and a guide rail 70 is disposed in parallel with the scale plate 7. An assembly 5 movable along the guide rail 70 consists of a pointer 50, a recording pen 53, a support arm 54, a holder 55 fitted loosely into the guide rail 70, and an exciting means 4 for a positional feedback means 9 which will be described afterward. A string 71 is attached to the holder 55 and engaged with a drive pulley 75 connected to a balancing motor 74 through pulleys 72 and 73. A recording chart 8 is fed in the direction of an arrow a.

In the positional feedback means 9, the magnetostrictive wire 1 is disposed substantially in parallel with the guide rail 70, and the exciting means 4 is shifted together with the moving assembly 5 to generate an ultrasonic signal in the magnetostrictive wire 1. Signal receiving means 2 and 3 are anchored at the two ends of the wire 1, and each of these means is composed of a coil or piezoelectric element. The exciting means 4 is composed also of a coil or the like and is coupled to the magnetostrictive wire 1 in the manner to be shiftable with the moving assembly 5 while being interposed between the first and second receiving means through the magnetostrictive wire.

Figure 9:
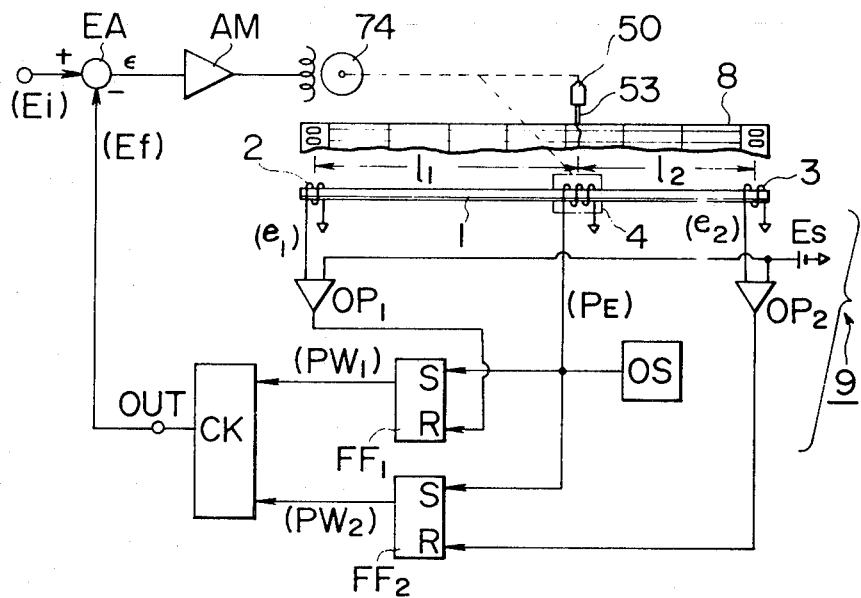
FIG. 9 is an electric circuit diagram of FIG. 8.

FIG. 9 is a circuit diagram of the embodiment shown in FIG. 8. In this diagram, an input signal Ei to be measured and recorded is applied to a difference detector EA which also receives a feedback signal Ef obtained from computing circuitry CK. The difference $\epsilon$ is applied to an amplifier AM which serves to drive the balancing motor 74. When the motor 74 is driven, the moving assembly 5 is shifted by the string 71 along the guide rail 70, thereby causing the exciting means 4 to shift along the magnetostrictive wire 1. The overall control loop including the amplifier AM and the balancing motor 74 shifts the moving assembly 5 to satisfy the condition Ef=Ei, and thus automatic balance is attained. Consequently, this enables the moving assembly 5 or the recording pen 53 to follow the input signal Ei with accuracy, and the value of the input signal Ei can be detected from the record position.

Figure 10:
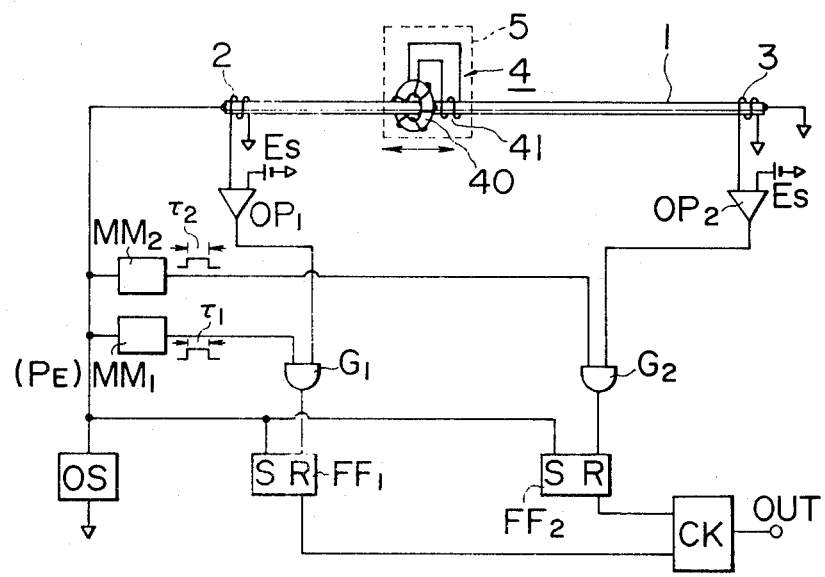
FIGS. 10, 11, 13 and 14 show the structures of some exemplary exciting means adapted for use in the invention.

FIGS. 10, 11, 13 and 14 show the structures of some exemplary exciting means adapted for use in the device of this invention. In the example of FIG. 10, an exciting means 4 consists of a transformer 40 which has a trochoidal iron core freely shiftable along the magnetostrictive wire 1 and enables the wire to function as a primary winding thereof, and an exciting coil 41 coupled to the wire 1 and receiving a signal generated in a secondary winding of the transformer 40. An exciting pulse PE is fed from a pulse oscillator OS to the magnetostrictive wire 1. This exciting pulse is capable of generating an ultrasonic signal through the transformer 40 at the position of coil 41 on the wire 1. In this example, gate circuits $G_1$ and $G_2$ are provided on the output sides of operational comparison amplifiers $OP_1$ and $OP_2$, and are closed by the output signals of monostable multivibrators $MM_1$ and $MM_2$ for fixed time periods $\tau_1$ and $\tau_2$ after application of the exciting pulse PE, so as to achieve effective prevention of noise that may occur during $\tau_1$ and $\tau_2$ after the exciting pulse.

Figure 11:
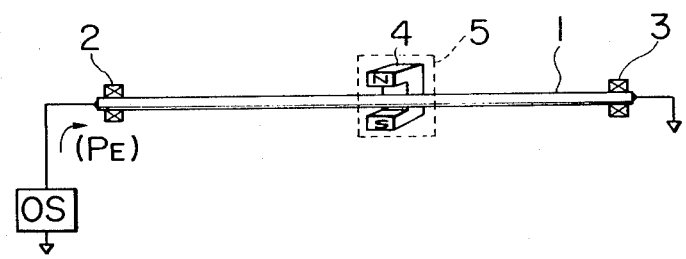
Figure 12:
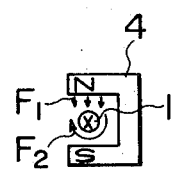
FIG. 12 illustrates the operating principle of FIG. 11.

In the example of FIG. 11, an exciting means 4 is composed of a permanent magnet which is so disposed that its magnetic field intersects a magnetostrictive wire 1, and an exciting pulse PE from a pulse oscillator OS is fed to the magnetostrictive wire 1. Upon application of the exciting pulse PE thereto, as shown in FIG. 12, the magnetic field distribution is unbalanced due to the interaction between the magnetic field $F_1$ caused by the exciting pulse current and the magnetic field $F_2$ of the permanent magnet 4, thereby generating an ultrasonic signal in the magnetostrictive wire 1 at the position of the permanent magnet 4.

Figure 13:
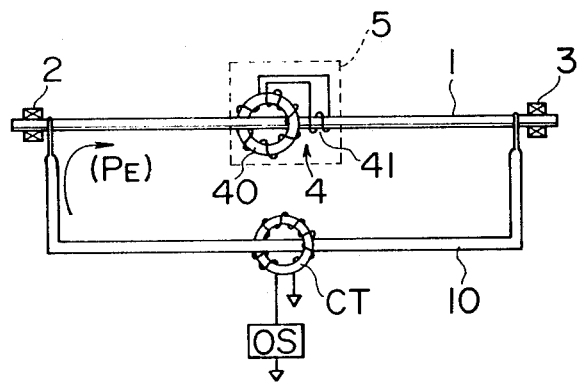

In the example of FIG. 13, an exciting means 4 has the same composition as that of the one used in FIG. 10, but a difference exists in the means that feeds an exciting pulse PE to a magentostrictive wire 1. That is, the wire 1 forms an electric closed loop in cooperation with a conductor 10, and the output of the exciting pulse oscillator OS is fed to the exciting means 4 through a current transformer CT in which the conductor 10 functions as a secondary winding thereof. Application of the exciting pulse PE to the magnetostrictive wire 1 is effected at the positions spaced apart slightly from the end faces of the wire so as to avoid flow of the exciting pulse PE in the signal receiving coils 2 and 3.

Figure 14:
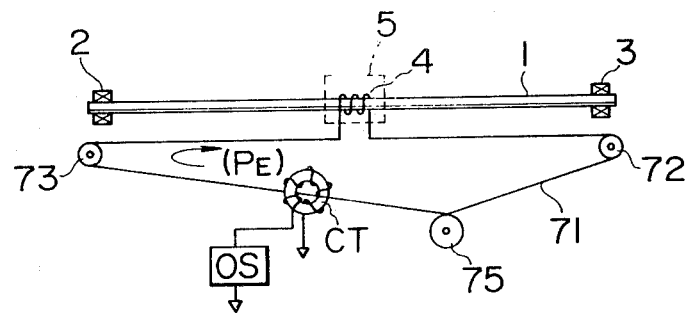

In the example of FIG. 14, a string 71 for driving a moving assembly 5 or an exciting means 4 is composed of a conductive material and serves as a secondary coil of a current transformer CT which is equipped with an iron core and enables the string to be freely movable, and an exciting pulse PE from a pulse oscillator OS is fed to the exciting means 4 through the current transformer CT. The exciting means 4 is connected electrically to the string 71 so as to receive the exciting pulse by way of the string.

By virtue of constituting the exciting means 4 as illustrated in FIGS. 10, 11, 13 and 14, no leadwire is required for applying the exciting pulse so that some advantages are attainable in simplifying the structure and eliminating breakdown faults that result from fatigue of the leadwire and so forth.

Figure 15:
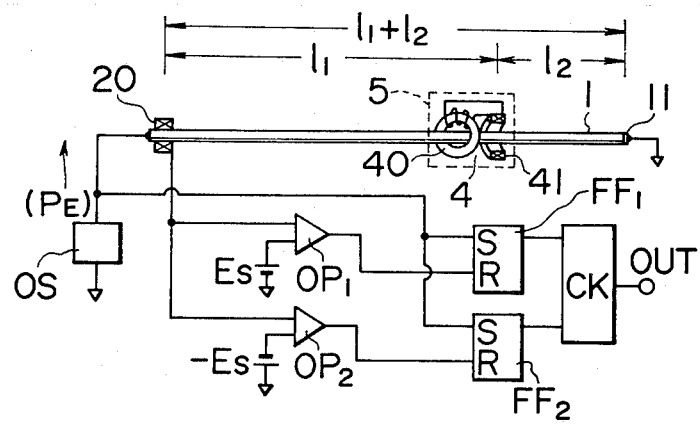
FIG. 15 is a block diagram of another embodiment of the invention.

FIG. 15 is a block diagram of another embodiment of the invention, in which one end 11 of a magnetostrictive wire 1 is so formed as to reflect an ultrasonic signal generated in the wire 1, and a receiving means 20 serving as both first and second receiving means is provided at the other end of the wire 1. An exciting means 4 employed in this example is the same as the one shown in FIG. 10, but other types are also applicable.

Figure 16:
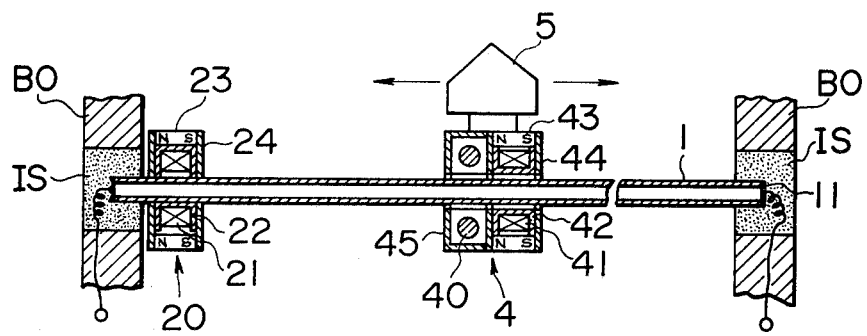
FIG. 16 is a sectional view of the device of FIG. 15.

FIG. 16 is a sectional view of the said magnetostrictive wire 1, receiving means 20 and exciting means 4 in the device of FIG. 15. The magnetostrictive wire 1 is composed of a hollow pipe and is supported at its two ends by outer frames BO with a vibration damping material IS such as rubber or plastic, so as to prevent direct transmission of mechanical vibration from the outer frames BO to the wire 1. The receiving means 20 consists of a bobbin 22 through which the wire 1 pierces, a receiving coil 21 wound around the bobbin 22, shield plates 24 located on the two end faces of the coil 21, and a permanent magnet 23 interposed between the shield plates 24 to couple them to each other and constituting a case for the coil 21 in cooperation with the shield plates 24. The permanent magnet 23 functions to increase the detection sensitivity by applying a DC magnetic field of a proper intensity to the magnetostrictive wire 1. The exciting means 4 consists of a bobbin 42, an exciting coil 41 wound around the bobbin, shield plates 44, a permanent magnet 43, and a case 45 housing a transformer 40 therein. With the exception of the transformer 40 and the case 45, the exciting means has substantially the same composition as that of the receiving means 20, and the permanent magnet 43 functions to generate an ultrasonic signal efficiently in the magnetostrictive wire 1.

Figure 17:
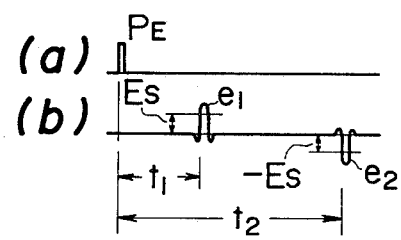
FIG. 17 illustrates signal waveforms related to the operation in FIG. 15.

In the device of FIG. 15, the ultrasonic signal generated in the magnetostrictive wire 1 at the position of the exciting means 4 propagates first toward the two ends of the wire. When the signal advancing leftward from the exciting coil 41 reaches the receiving coil 20, a signal $e_1$ of FIG. 17(b) is detected by the coil 20. In the meanwhile, the signal advancing rightward from the exciting coil 41 is reflected at the end face 11 and then returns by way of the wire 1 to reach the receiving coil 20, so that a signal $e_2$ of FIG. 17(b) is detected by the coil 20. The signal $e_1$ reaching the receiving coil 20 directly from the exciting coil 41 and the signal $e_2$ reaching the coil 20 after reflection at the end face 11 are opposite in polarity to each other as illustrated, but the polarities of the two signals can be rendered mutually equal depending on the condition of the end face 11. The time width $t_1$, which is required until the signal $e_1$ is detected by the receiving coil 20 after application of the exciting pulse PE as shown in FIG. 17(a), is equivalent to the distance $l_1$ between the exciting coil 41 and the receiving coil 20. And the time width $t_2$ required until detection of the signal $e_2$ is equivalent to the total distance $l_2$ from the exciting coil 41 to the end face 11 and the distance $l_1+l_2$ (constant) from the end face 11 to the receiving coil 20, represented by $l_1+2l_2$.

An operational comparison amplifier $OP_1$ selects the positive input signal $e_1$ detected first out of the two signals received from the coil 20 and resets a flip-flop circuit $FF_1$. Similarly, another operational comparison amplifier $OP_2$ selects the negative input signal $e_2$ out of the two signals from the receiving coil 20 and resets a flip-flop $FF_2$. Then the computing circuitry CK executes computation of Equation 3. The device of such a structure offers an advantageous feature that a signal proportional accurately to the displaced position x of the moving assembly is obtainable by a single receiving coil without being affected by the propagation velocity $v_s$.

Figure 18:
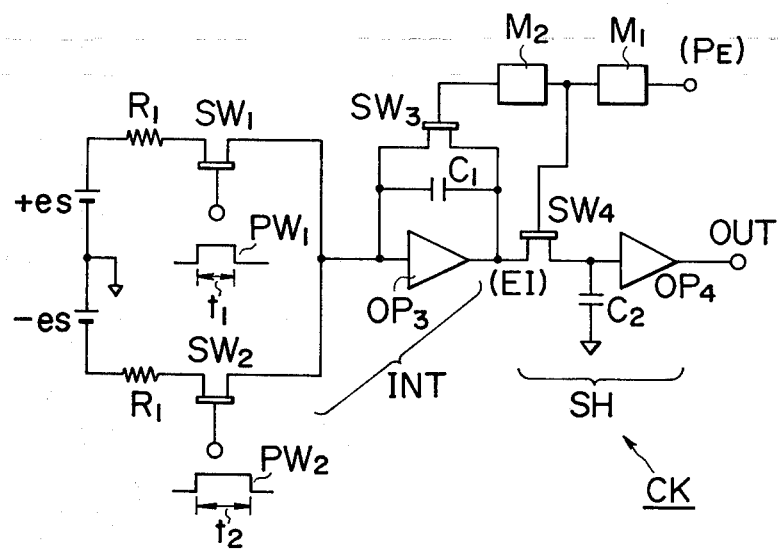
FIGS. 18 and 20 are connection diagrams of exemplary computing circuitries for use in the invention.
Figure 20:
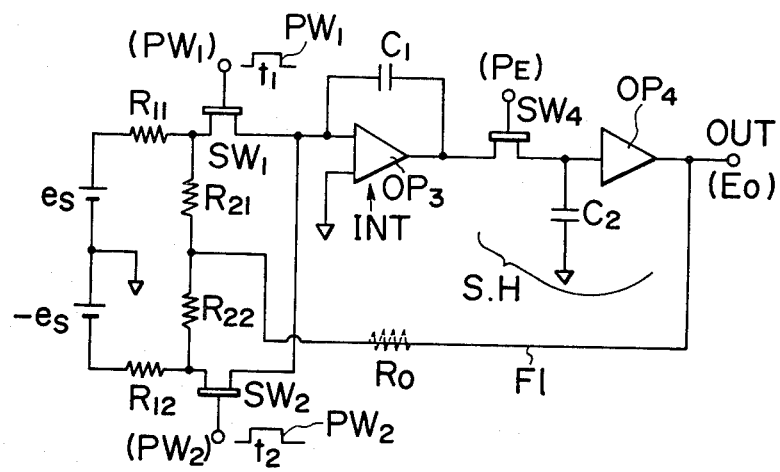

FIGS. 18 and 20 are connection diagrams of exemplary computing circuitries for use in the invention, each showing an analog circuit configuration.

Figure 19:
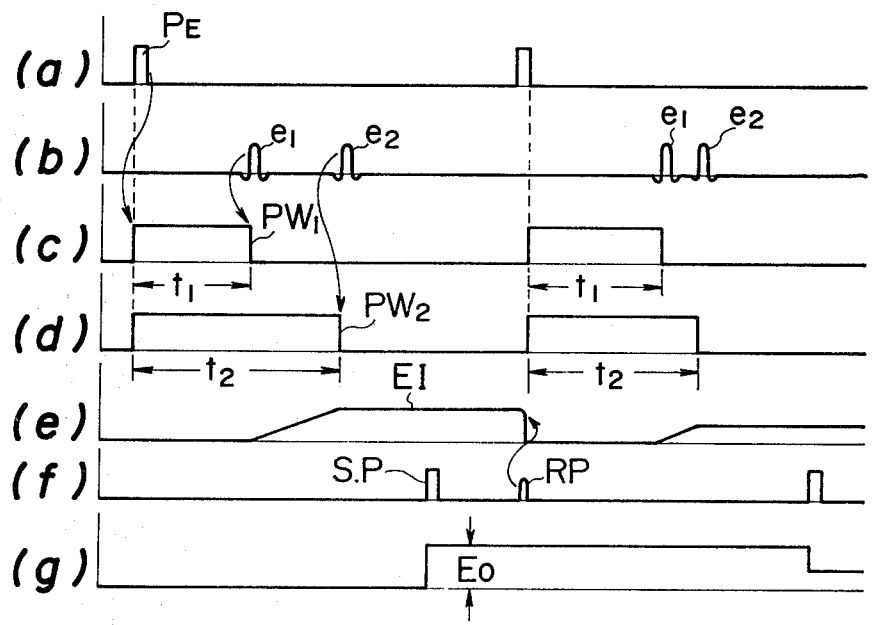
FIG. 19 illustrates signal waveforms related to the operation in FIG. 18.

In FIG. 18, switches $SW_1$ and $SW_2$ are turned on by time-width signals $PW_1$ and $PW_2$ obtained from flip-flop circuits. An integrator INT including a capacitor $C_1$ and an operational amplifier $OP_3$ integrates a reference supply voltage $+e_s$ applied thereto through a resistor $R_1$ and the switch $SW_1$, and also another reference supply voltage $-e_s$ applied thereto through the resistor $R_1$ and the switch $SW_2$. If now the absolute values of the two reference supply voltages $+e_s$ and $-e_s$ are equal to each other, the output voltage EI of the integrator INT is maintained at zero as shown in FIG. 19(e) during conduction of the switches $SW_1$ and $SW_2$, since both $+e_s$ and $-e_s$ are applied to the input terminal of the integrator INT through the resistor $R_1$ and the two switches. In the state where either $SW_1$ or $SW_2$ alone is turned on (here $SW_2$), the related reference supply voltage $e_s$ of one polarity is applied to the integrator INT through the resistor $R_1$. Accordingly, the output voltage EI thereof is expressed as follows.

$$EI = -\frac{e_s}{C_1 \cdot R_1}(t_1 - t_2) \quad \text{Eq. 8}$$

In Equation 8, values of both the capacity $C_1$ and the resistance $R_1$ are constant, and $e_s$ is also of a fixed value. Consequently, the output voltage EI of the integrator INT after the lapse of $t_2$ comes to correspond to $t_1-t_2$, that is, $l_1-l_2$.

The signal EI related to the position of the moving assembly 5 is sampled by sampling pulses SP of FIG. 19(f) obtained from a monostable multivibrator $M_1$ and is produced as shown in FIG. 19(g) from the output terminal OUT of a sample hold circuit SH. After the lapse of a predetermined time, the switch $SW_3$ is closed by a reset pulse RP from a monostable multivibrator $M_2$, and the charge of the capacitor $C_1$ in the integrator INT is discharged (refer to FIG. 19(e) and (g)).

FIG. 20 is a modification of the circuit of FIG. 18, in which the output voltage Eo of the sample hold circuit SH is applied to the input terminal of the integrator INT by way of a leadwire Fl, resistors $R_{21}$ and $R_{22}$ and switches $SW_1$ and $SW_2$, and the reset switch for the capacitor $C_1$ is omitted. In such a circuit configuration, an output signal Eo varying stepwise at each period of the sampling pulse SP is obtained when the condition of $l_1=l_2$ ($t_1=t_2$) is changed to $l_1 \neq l_2$. If the resistances are so selected as $R_1=R_{11}=R_{12}$ and $R_2=R_{21}=R_{22}$, the output voltage Eo becomes as follows in a steady state attained after the lapse of several periods.

$$Eo = \frac{R_2}{R_1} \cdot e_s \cdot \frac{t_1 - t_2}{t_1 + t_2} \quad \text{Eq. 9}$$
$$= \frac{R_2}{R_1} \cdot e_s \cdot \frac{l_1 - l_2}{l_1 + l_2}$$

Therefore, as compared with FIG. 18, the computing circuitry of FIG. 20 is advantageous in the point that no influence is caused by the propagation velocity $v_s$ of the ultrasonic signal or the value of the capacitor $C_1$.

Figure 21:
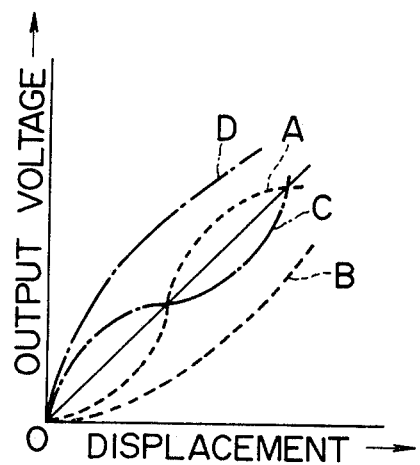
FIG. 21 graphically represents the relationship between displacement and output voltage in the circuitry of FIG. 20.

In this circuitry, relationship between the displacement of the moving assembly and the output voltage Eo can be rendered nonlinear as represented by A, B, C and D in FIG. 21 through connection of the resistor RO to the leadwire Fl as shown by a dotted line and also through proper adjustment of the resistance values of $R_{11}$, $R_{12}$, $R_{21}$, $R_{22}$ and Ro.

Figure 22:
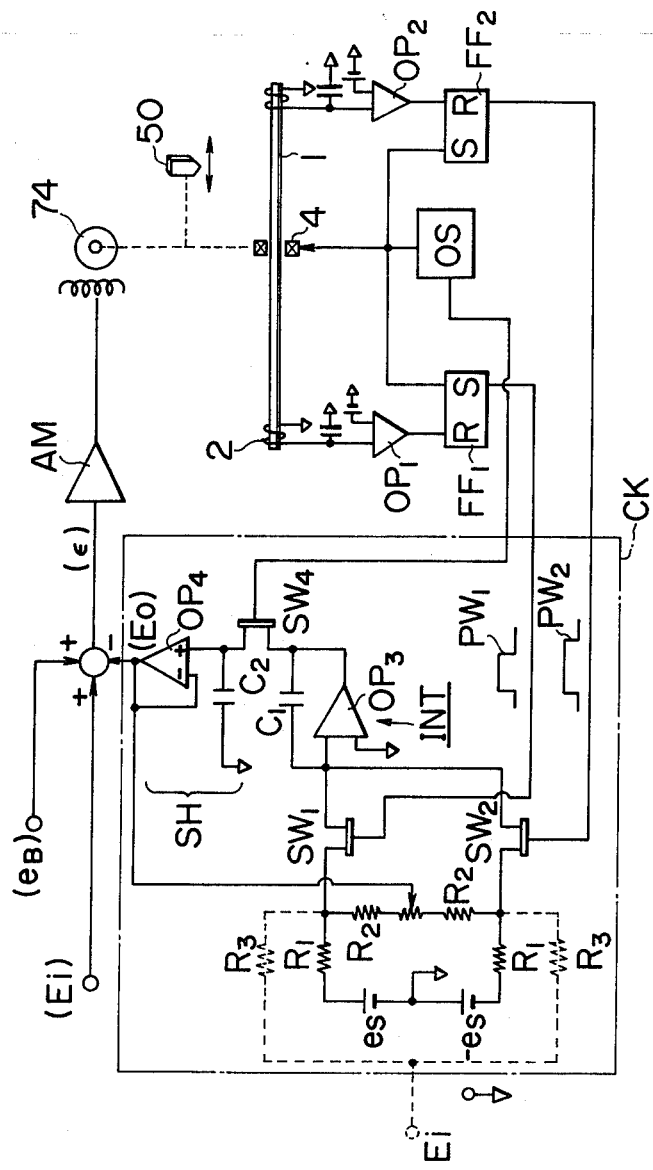
FIG. 22 is a block diagram of an example where the device of this invention is applied to an automatic balance instrument.

FIG. 22 is a block diagram of an example where the device of this invention is applied to an automatic balance instrument. A computing circuitry CK employed in this example is the same as the one in FIG. 20. In FIG. 22, $e_B$ denotes a bias signal for establishing the zero or reference position of a pointer 50 is a moving assembly, and a balancing motor 74 moves the pointer 50 to satisfy the condition $E_i + e_B = E_o$. This circuitry may be so modified that the input signal $E_i$ and the bias signal $e_B$ are applied to one terminal (−) of an operational amplifier $OP_4$ through resistors individually, and also that the balancing motor 74 is driven by the output of the operational amplifier $OP_4$. Moreover, it is also possible to apply the input signal $E_i$ or the bias signal $e_B$ to the input terminal of an integrator INT by way of a resistor $R_3$ and two switches $SW_1$ and $SW_2$ as shown by broken lines. In any of the above cases, the amplifier AM can be omitted by enabling the operational amplifier $OP_4$ to have a fixed gain.

This circuit configuration is directly applicable even to an example where one end of a magnetostrictive wire 1 is formed to reflect an ultrasonic signal while the other end thereof is equipped with a single receiving means which functions as a combination of first and second receiving means.

Furthermore, the device of this invention may be constituted of proper combinations of any of the featured circuits shown in the aforementioned embodiments.

We claim:

1. A displaced position detecting device comprising:
   a wire composed of a magnetostrictive material;
   first and second receiving means coupled to said magnetostrictive wire;
   an exciting means for applying an exciting signal to the wire and disposed between the first and second receiving means;
   means for changing the distance between the exciting means and at least one of said receiving means in accordance with a mechanical displacement;
   means for developing two signals representing the time periods required for said exciting signal to reach the first and second receiving means respectively; and
   circuit means responsive to said two signals for producing a signal representative of said mechanical displacement.

2. The displaced position detecting device as defined in claim 1, wherein said circuit means includes means to execute computation of $(t_1 - t_2)/(t_1 + t_2)$ by the use of two input signals related to the time periods $t_1$ and $t_2$ required for the signal, which is generated in the magnetostrictive wire by the exciting means, to reach the first and second receiving means.

3. The displaced position detecting device as defined in claim 1, wherein the first and second receiving means are anchored to the magnetostrictive wire, and the exciting means is movable in accordance with the mechanical displacement.

4. The displaced position detecting device as defined in claim 1, wherein the first and second receiving means are anchored to the magnetostrictive wire, and said wire is movable in accordance with the mechanical displacement.

5. The displaced position detecting device as defined in claim 1, wherein the exciting means is anchored to the magnetostrictive wire, and the first and/or second receiving means is movable in accordance with the mechanical displacement.

6. The displaced position detecting device as defined in claim 1, wherein the distance from the exciting means to the first receiving means and/or the distance from the exciting means to the second receiving means are changed in accordance with a liquid surface displacement.

7. The displaced position detecting device as defined in claim 1, wherein the distance from the exciting means to the first receiving means and/or the distance from the exciting means to the second receiving means are changed in accordance with a differential pressure.

8. The displaced position detecting device as defined in claim 1 and adapted for use in an automatic balance instrument, wherein the distance from the exciting means to the first receiving means and/or the distance from the exciting means to the second receiving means are changed in accordance with the shift of a moving assembly driven by a balancing motor, and the output signal of the computing circuitry means serves as a feedback signal related to the position of said moving assembly.

9. The displaced position detecting device as defined in claim 1, wherein gate circuits are provided at the output sides of the first and second receiving means and are closed for a fixed time after an exciting pulse is fed to the exciting means.

10. The displaced position detecting device as defined in claim 1, wherein the exciting means consists of a transformer with an iron core so coupled as to enable the magnetostrictive wire to function as a primary coil thereof, and an exciting coil coupled to the magnetostrictive wire and receiving the signal generated in a secondary coil of said transformer; and an exciting pulse is fed to said wire.

11. The displaced position detecting device as defined in claim 1, wherein the exciting means consists of a permanent magnet whose magnetic field intersects the magnetostrictive wire, and an exciting pulse is fed to said wire.

12. The displaced position detecting device as defined in claim 10, wherein an exciting pulse is fed to the magnetostrictive wire through a current transformer whose secondary coil is composed of a conductor including the magnetostrictive wire to form a closed loop therewith.

13. The displaced position detecting device as defined in claim 11, wherein an exciting pulse is fed to the magnetostrictive wire through a current transformer whose secondary coil is composed of a conductor including the magnetostrictive wire.

14. The displaced position detecting device as defined in claim 1, wherein a string for driving the exciting means is composed of a conductive material, and an exciting pulse is fed through a current transformer with an iron core which renders the string movable and enables the same to function as a secondary coil of the transformer, so that the exciting means receives the exciting pulse by way of the string.

15. The displaced position detecting device as defined in claim 1, wherein the circuit means comprises two gate circuits controlled to be opened or closed individually by two time-width signals; two counters for counting clock pulses applied thereto through said gate circuits; and
   a microprocessor to which digital signals are applied from said two counters.

16. The displaced position detecting device as defined in claim 1, wherein the circuit means comprises two reference voltage sources whose outputs are different in polarity from each other; two switches connected to said reference voltage sources respectively and driven by two time-width signals; an integrator to which the outputs of said reference voltage sources are applied through said switches; and a circuit for sampling and holding the output of said integrator.

17. The displaced position detecting device as defined in claim 16, wherein the output signal of the sample hold circuit is fed to the input side of the integrator through two switches driven by two time-width signals respectively.

18. The displaced position detecting device as defined in claim 17, wherein relationship between the mechanical displacement and the output signal of the sample hold circuit is rendered nonlinear by changing the value of a resistor connected in series with the reference voltage sources and the switches and also the value of another resistor connected between the switches and the output terminal of the sample hold circuit.

19. The displaced position detecting device as defined in claim 1, wherein the receiving means and the exciting means consists of coils, and said coils are housed in shield cases each containing a permanent magnet in a portion thereof.

20. A displaced position detecting device comprising: a magnetostrictive wire composed of a magnetostrictive material and so formed that one end thereof reflects an ultrasonic signal; a receiving means coupled to the magnetostrictive wire and located in the vicinity of the other end of said wire; an exciting means coupled to the magnetostrictive wire and capable of generating an ultrasonic signal in said wire; means for changing the distance between the exciting means and the receiving means in accordance with a mechanical displacement; means for developing two signals of which one is related to the time required for said ultrasonic signal to reach the receiving means directly, and the other is related to the time required for said ultrasonic signal to reach the receiving means after reflection at one end of said wire; and a computing circuit means responsive to said two signals for producing a signal representative of said mechanical displacement.

21. The displaced position detecting device as defined in claim 20, wherein said computing circuit means executes computation of $(t_1-t_2)/(t_1+t_2)$ by the use of an input signal related to the time width $t_1$ required for the ultrasonic signal, which is generated in the magnetostrictive wire by the exciting means, to reach the receiving means directly, and also by the use of another input signal related to the time width $t_2$ required for said ultrasonic signal to reach the receiving means after reflection at one end of said wire.

22. The displaced position detecting device as defined in claim 20, wherein the exciting means consists of a transformer with an iron core so coupled as to enable the magnetostrictive wire to function as a primary coil thereof, and an exciting coil coupled to the magnetostrictive wire and receiving the signal generated in a secondary coil of said transformer; and an exciting pulse is fed to said wire.

23. A displaced position detecting device for use in an automatic balance instrument, comprising: a magnetostrictive wire composed of a magnetostrictive material; a first receiving means, a second receiving means and an exciting means coupled to the magnetostrictive wire respectively; a means for changing the distance between the exciting means and the first receiving means and for changing the distance between the exciting means and the second receiving means in accordance with the shift of a moving assembly driven by a balancing motor; circuit means for producing two time-width signals changed differentially to each other and related to the time widths required for the signal, which is generated in the magnetostrictive wire by the exciting means, to reach the first and second receiving means respectively; two reference voltage sources whose outputs are different in polarity from each other; two switches connected to said reference voltage sources respectively and driven by the two time-width signals respectively; an integrator to which the reference voltages are applied through the two switches; a circuit for sampling and holding the output of the integrator; and a circuit means for feeding the output signal of the sample hold circuit to the input terminal of the integrator through the two switches: wherein the output signal of said sample hold circuit is used as a feedback signal related to the position of said moving assembly.

24. The displaced position detecting device as defined in claim 23, wherein one end of said magnetostrictive wire is so formed as to reflect the ultrasonic signal, and receiving means serving as both said first and second receiving means is provided in the vicinity of the other end of said wire.

25. The displaced position detecting device as defined in claim 23, wherein input signals to be indicated by automatic balance are applied to the input terminal of the integrator through resistors and two switches, and the balancing motor is driven by the output signal of an amplifier having a fixed gain and constituting the sample hold circuit.

* * * * *